United States Patent [19]

Deines et al.

[11] 4,147,631
[45] Apr. 3, 1979

[54] WATER CONTROL AND DISTRIBUTION APPARATUS

[75] Inventors: Siegmund Deines, Ft. Collins; Gary L. Swiercinsky, Loveland; Craig E. Engstrom, Ft. Collins, all of Colo.

[73] Assignee: Teledyne Industries, Inc., Ft. Collins, Colo.

[21] Appl. No.: 836,155

[22] Filed: Sep. 23, 1977

[51] Int. Cl.² .................. B01D 27/02; B01D 35/02
[52] U.S. Cl. .................. 210/137; 210/152; 210/238; 210/282; 210/288; 210/424; 210/456
[58] Field of Search .................. 137/544, 625.47; 138/40, 42, 44; 210/152, 232, 238, 251, 281, 282, 288, 424, 440, 443, 456, 137

[56] References Cited

U.S. PATENT DOCUMENTS

| Re. 20,238 | 1/1937 | Lamela et al. | 210/281 |
|---|---|---|---|
| 643,411 | 2/1900 | Kammerer | 210/152 |
| 953,637 | 3/1910 | McCollom | 210/424 X |
| 998,585 | 7/1911 | Milner | 210/251 |
| 1,011,797 | 12/1911 | Howell | 210/251 X |
| 1,337,061 | 4/1920 | Forrest, Jr. | 210/456 X |
| 1,958,073 | 5/1934 | Seidel | 210/251 |
| 2,271,982 | 2/1942 | van Kreveld | 138/44 X |
| 2,389,134 | 11/1945 | Brown | 210/137 X |
| 2,454,929 | 11/1948 | Kempton | 210/137 X |
| 2,497,978 | 2/1950 | Carlson | 138/44 |
| 3,184,064 | 5/1965 | Sampson et al. | 210/282 X |
| 3,204,770 | 9/1965 | Brink | 210/282 |
| 3,653,514 | 4/1972 | Holler et al. | 210/281 |
| 3,741,394 | 6/1973 | Defenbaugh | 210/282 |
| 3,802,563 | 4/1974 | Sasaki et al. | 210/281 X |

FOREIGN PATENT DOCUMENTS 2535848 2/1977 Fed. Rep. of Germany ........... 210/282

Primary Examiner—Robert H. Spitzer
Attorney, Agent, or Firm—Hugh H. Drake

[57] ABSTRACT

A water filter apparatus includes a housing having a horizontally-disposed base unit. A coupling upstands from one end portion of the base unit and is attachable to a faucet for receiving a supply of water. An outlet is downwardly directed from the base unit to discharge water received through the coupling. Also disposed within the base unit is a valve that selectively permits the flow of water through the coupling and in discharge from the outlet. Upstanding from another portion of the base unit is an inverted cup-shaped cap. An input fluid channel within the base unit leads from the valve to the chamber defined by the cap, and the valve selectively permits the flow of water through the coupling into the input channel and from that into the chamber. A filter cartridge disposed within the cap has an inlet opening communicating water from the input channel to the filter material. The cartridge also has an outlet opening disposed beneath the top wall of the cap for communicating water from the material and out of the cartridge. Located at the top of the cap is a spigot for emitting water discharged from the outlet opening of the cartridge. Finally, there is a control for regulating the flow of water from the outlet opening of the cartridge through the spigot and another control for regulating flow rate.

16 Claims, 15 Drawing Figures

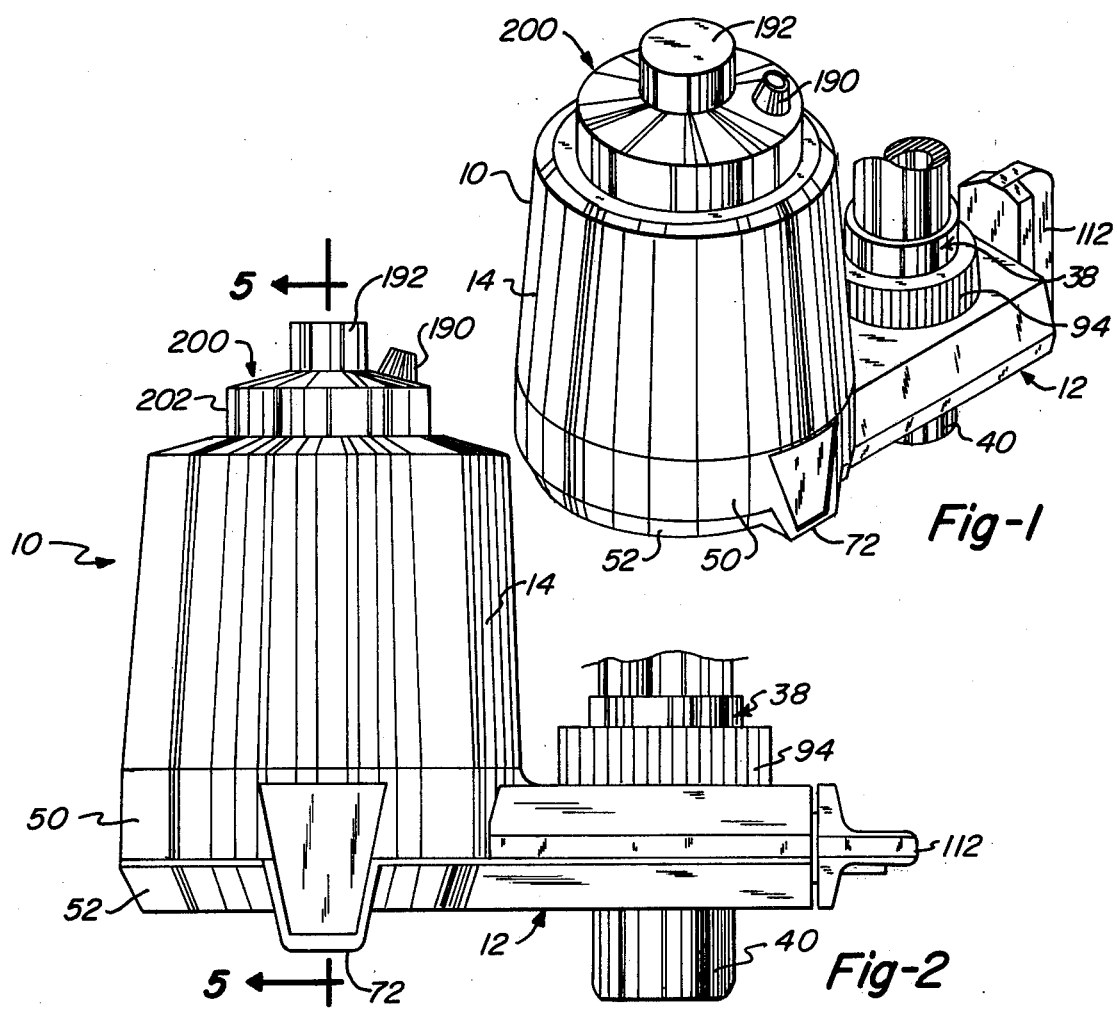
Fig-1
Fig-2
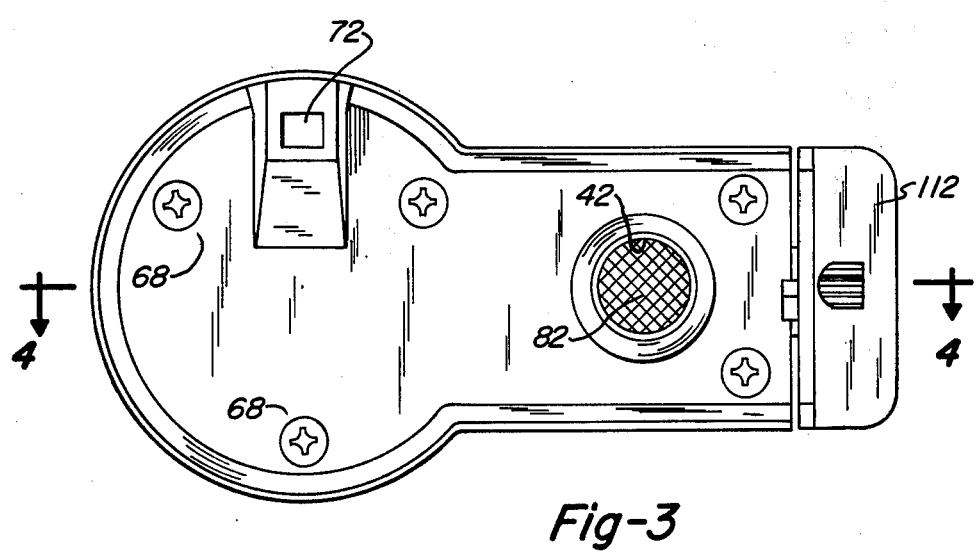
Fig-3

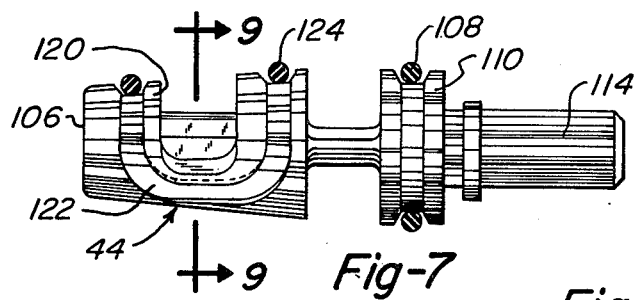
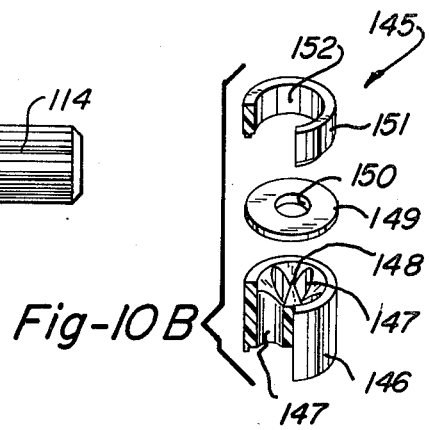
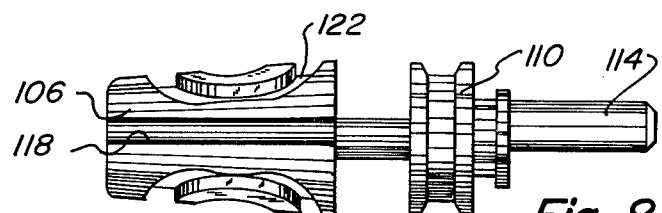
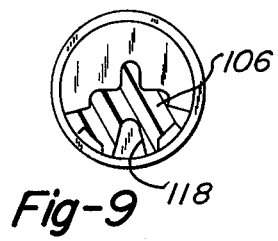
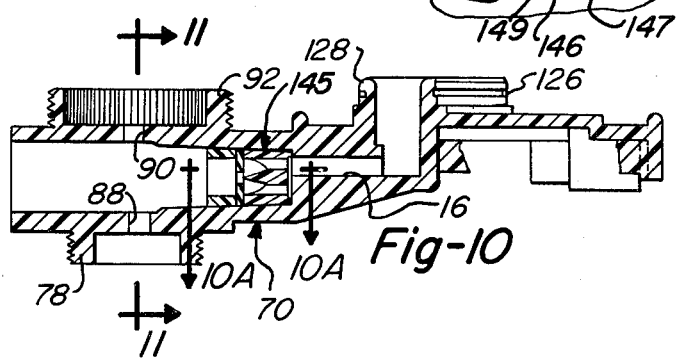
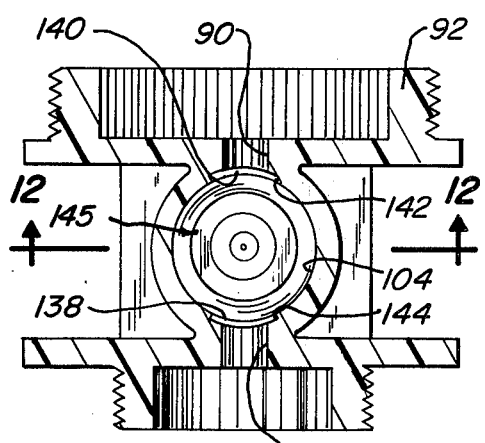
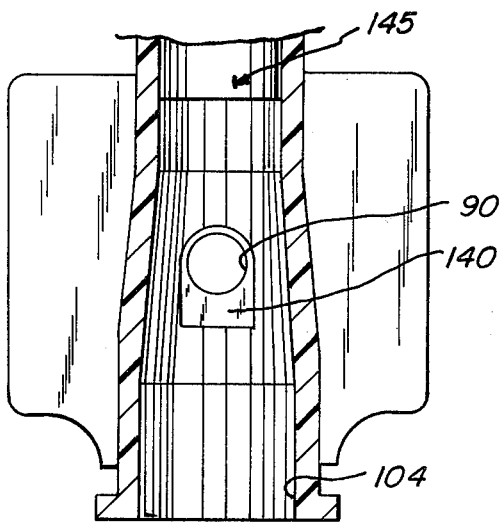

WATER CONTROL AND DISTRIBUTION APPARATUS

RELATED APPLICATIONS

The present application describes a filter cartridge which also was described and claimed in application Ser. No. 617,449, filed Sept. 29, 1975, and now abandoned, with respect to which there is a copending continuing application Ser. No. 784,420, filed Apr. 4, 1977. The overall arrangement and many of the details of the embodiment of the present application also are described and claimed in copending application Ser. No. 691,830, filed June 1, 1976. All of the aforesaid prior applications are assigned to the same assignee as the present application.

The present invention pertains to water control and distribution apparatus. In one aspect, it relates to such an apparatus that serves as a drinking fountain of purified water. It also relates to regulation of the distribution of water.

As already explained in the cross-referenced applications, surveys have indicated that a significant percentage of water obtained from individual taps in the home and the like contains one or more bacteriological or chemical constituents that exceed limits set forth in standards issued by public health services. In some cases, such samples evidence a potential danger. Various studies have identified a need for improved systems to control at least aesthetically undesired concentrations of various minerals and other constituents as well as color, taste and odor. The problem is one of both preventing the transmission of disease or the like as well as in overcoming effects that may be adverse to the sensibilities of the user.

One prior answer has been a steadily increasing usage of bottled water. At the same time, there have been a number of entries into the marketplace of point-of-use purification devices. The latter have included in-line filters, under-the-sink-filters, free-standing drink-size separate filter units and filter devices that attach to the conventional sink faucets or to the typical aerator secured thereto.

In general, a somewhat limited number of processes have been found to be capable of removing undesired materials from water. These include reverse osmosis, freezing, filtration, chemical oxidation, distillation, absorption on powdered charcoal, and absorption on granular activated carbon. Carbon filtration has been found to be particularly effective in removing detergents, insecticides, viruses, specific chemical pollutents and taste and odor pollutents. For example, carbon has long been used for the removal of chlorine from water in the brewing and soft drink manufacturing industries. Activated carbon removes tastes and odors from water by an adsorption process in which substances of one kind are accumulated on the surfaces of another. The activated carbon has extremely large surface areas that make it efficient. The activation process produces pores that contribute substantially to increased surface area of the treatment. In some cases, the activated carbon has been treated with oligodynamic silver which acts as a bactericide and self-sanitizing agent.

One desirable location for a water purifier is in the vicinity of the kitchen sink in a conventional home. Another is in the bathroom. The addition of a water purifying apparatus has frequently meant the undesired occupation of counter space or undersink space or interference to convenient utilization. The earlier of the above-cross-referenced applications discloses apparatus that is particularly attractive for use in such an environment because it is adaptable for substitution in place of the more-or-less conventional vegetable spray often present as a part of the overall kitchen sink unit.

Several manufacturers have commercially marketed a kind of water filter that is intended for attachment to a conventional sink faucet. Particularly when a vegetable spray hose or other separate source of water is not conveniently available, such a faucet-attachment unit often is appropriate. Such prior devices of this particular kind usually include a valve assembly for permitting the discharge of water either directly from the faucet or through a filter cartridge as desired.

It is a general object of the present invention to provide a new and improved water filter of the faucet-attachment type which also serves as a drinking fountain.

Another object of the present invention is to provide a filtered drinking-fountain unit which makes use of a now readily available water filter cartridge.

A further object of the present invention is to provide a drinking fountain of filtered water which in large part may be manufactured from already-available tooling.

Still another object of the present invention is to provide a water distribution unit in which flow rate is advantageously regulated.

A water filter apparatus in accordance with one form of the present invention includes a housing that has a horizontally-disposed base unit. A coupling upstands from one end portion of the base unit and is attachable to a faucet for receiving a supply of water. An outlet is downwardly directed from the base unit for discharging water received through the coupling. A valve disposed within the base unit selectively permits the flow of water through the coupling and in discharge from the outlet. Removably secured to upstand from another portion of the base unit is an inverted cup-shaped cap. The base unit has an input fluid channel which leads from the valve to the chamber defined by the cap, and the valve selectively permits the flow of water through the coupling into the input fluid channel and thus into the chamber. A filter cartridge is disposed within the cap and encloses a filtration material, the cartridge having an inlet opening communicating water from the input channel to the material and an outlet opening disposed within the cap for communicating water from the material and out of the cartridge. A spigot is located at the top of the cap for admitting water discharged from the outlet opening of the cartridge. Finally, a control is included for regulating the flow of water from the outlet opening of the cartridge through the spigot. Other features, such as flow regulation for best performance, are included.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 1 is a perspective view of a water purification device embodying the present invention;

FIG. 2 is a side-elevational view of the device of FIG. 1;

FIG. 3 is a bottom plan view thereof;

FIG. 7 is an inverted side-elevational of a part shown in FIG. 4;

FIG. 8 is a side-elevational view of the part of FIG. 7 rotated by 90° about its longitudinal axis and with certain parts removed;

FIG. 9 is a cross-sectional view taken along the line 9—9 in FIG. 7;

FIG. 10 is a reduced rear cross-sectional view of a part shown in FIG. 4;

FIG. 10A is a fragmentary and enlarged cross-sectional view taken along the line 10A—10A in FIG. 10;

FIG. 10B is an exploded perspective view of certain components shown in FIGS. 10 and 10A;

FIG. 11 is a cross-sectional view taken along the line 11—11 in FIG. 10;

FIG. 12 is a fragmentary cross-sectional view taken along the line 12—12 in FIG. 11.

Figure 4:
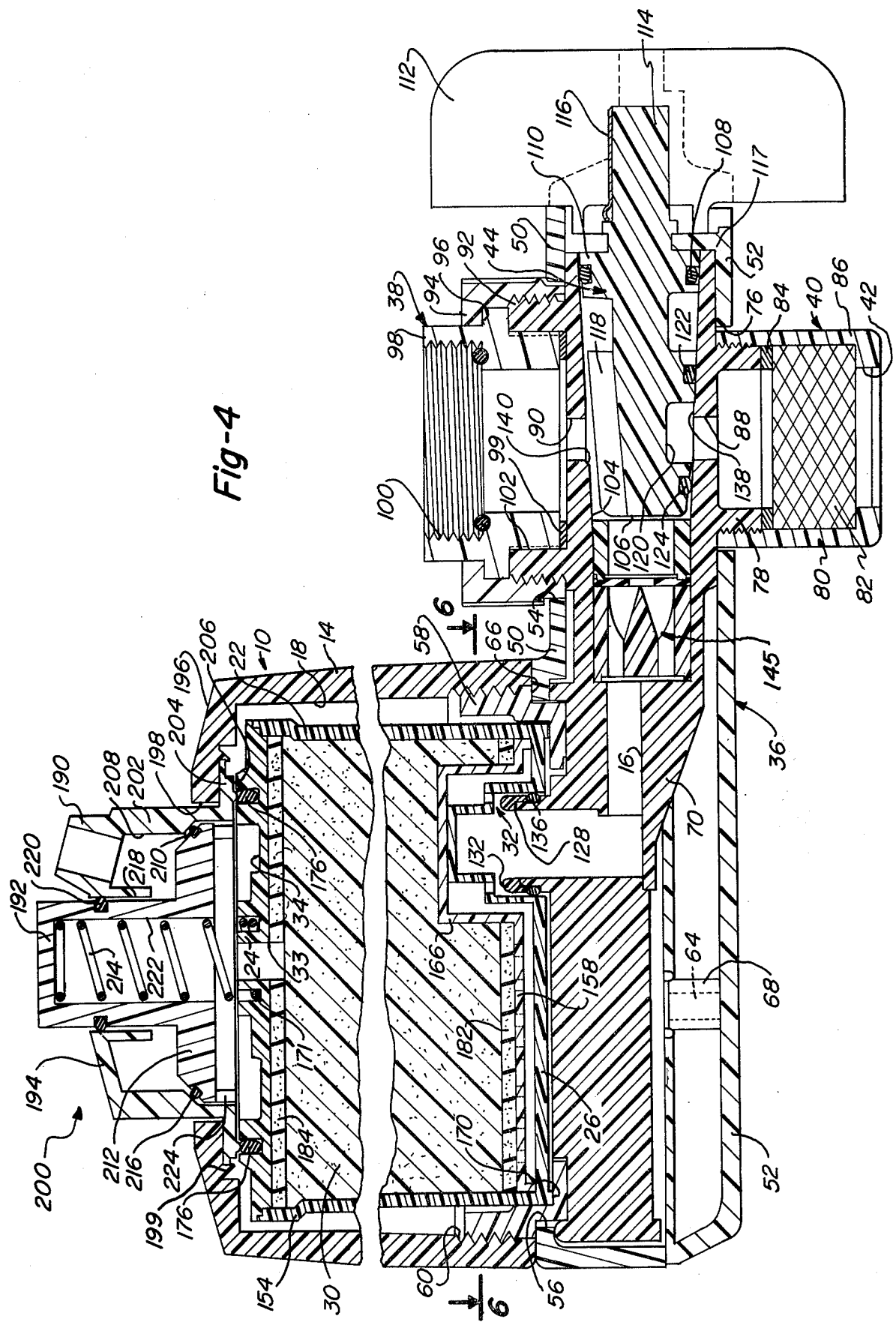
FIG. 4 is an enlarged vertical and partially cutaway cross-sectional view taken along the line 4—4 in FIG. 3, certain minor parts being in a different position.
Figure 5:
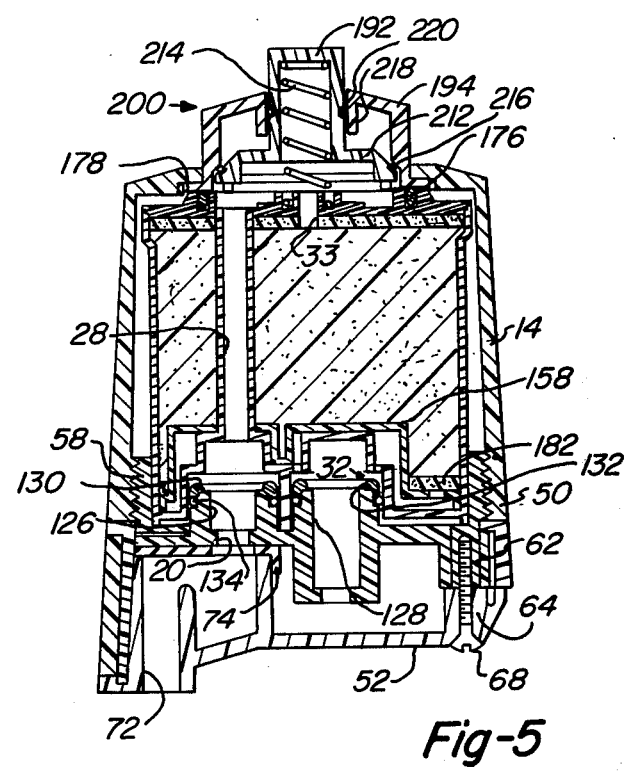
FIG. 5 is a fragmentary cross-sectional view taken along the line 5—5 in FIG. 2.
Figure 6:
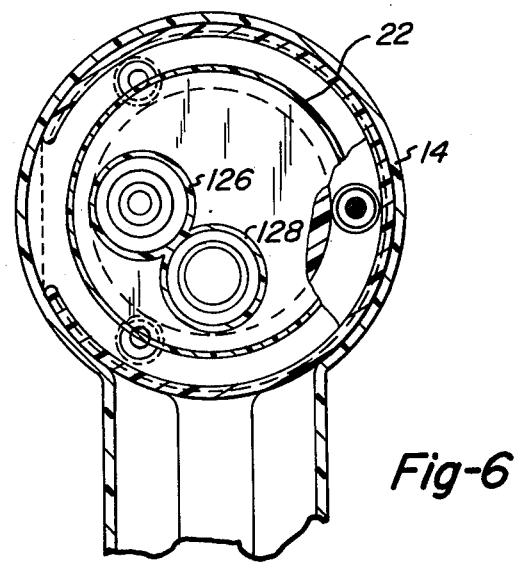
FIG. 6 is a reduced fragmentary cross-sectional view taken along the line 6—6 in FIG. 4.

As specifically embodied herein, a housing 10 generally has a base 12 and a generally-cylindrical cup-shaped cap 14 that is removably secured to base 12. Included within base 12 is an input fluid channel 16 (FIG. 4) that communicates with one end of a chamber 18 defined in major portion by cap 14. Also communicating with that end of chamber 18 is an outlet fluid channel 20 (FIG. 5). Disposed within chamber 18, and held in place by cap 14, is a filter cartridge 22. Extending between the opposing end walls 24 and 26 of cartridge 22 is a conduit 28. Cartridge 22 encloses or contains a purification material 30 primarily of granulated activated carbon. The carbon preferably is mixed with silver-loaded zeolite so as to inhibit bacteria growth within the filter. However, satisfactory results usually do not require silver loading. Material 30 surrounds conduit 28. Cartridge 22 includes an inlet opening 32 positioned in use to communicate with inlet channel 16 so as to permit fluid flow through filter material 30. Formed in outlet wall 24 of the cartridge is an outlet opening 33 arranged to communicate fluid flow from material 30 to the end of conduit 28 thereto adjacent in the bottom of a channel 34. Thus, filtered water is enabled to flow through conduit 28 and on through outlet channel 20, since the lower end of conduit 28 is positioned so as to communicate with the outlet channel.

Base 12 includes what may be called a control portion 36 which projects laterally to one side. Included in control portion 36 is an inlet coupling 38 that is attachable to a source of water supply and an outlet coupling 40 which defines an outlet passage 42. A valve 44 is carried within control portion 36 and serves to permit selective control of the distribution of water as between outlet passage 42 and inlet channel 16.

As particularly formed for present purposes, base 12 includes an upper cover member 50 mated to a lower cover member 52. One opening 54 in the upper cover member accommodates inlet coupling 38, while a second and larger opening 56 receives a flange 58. The latter is externally threaded as at 60 to receive corresponding internal threads on the lower end wall of cap 14 and thus secure the cap in place. In turn, flange 58 has integrally-formed downwardly-opening nuts 62 (FIG. 5) positioned so as to be in alignment with bosses 64 which project upwardly from lower cover member 52. Shoulders 66 formed on flange 58 just below threads 60 serve to clamp upper cover member 50 against lower cover member 52 upon the insertion through bosses 64 and tightening of screws 68.

Clamped between upper and lower cover members 50 and 52 is a valve body assembly 70. It will be observed that inlet channel 16 and outlet channel 20 are both formed into valve body assembly 70. Channel 20 terminates in an outlet flowway 72. When the overall device is assembled, the upper perimeter of flowway 72 is joined to assembly 70 by a seal 74 so as to form a continuation of outlet channel 20. Also formed in lower cover member 52 is an opening 76 which receives an externally-threaded boss 78 that projects downwardly from valve body assembly 70. As shown, an aerator unit 80, having an aeration element 82 fixed in place against a seal 84 and all enclosed within a shell 86, preferably is threaded upon boss 78. Leading to aerator 80 and formed in assembly 70 is an outlet port 88.

Opposite outlet port 88 is an inlet port 90 also formed in assembly 70 and located in the bottom of another outwardly projecting hollow boss 92. Input coupling 38 includes a retainer sleeve 94 threaded upon boss 92 and which has an inwardly projecting shoulder 96 that serves to secure a hollow faucet adaptor 98 in place. Adaptor 98 has internal threads 100 sized to fit the conventional faucet aerator threads on the faucet delivery end. Moreover, adaptor 98 is splined on its external lower periphery as at 102 so as to seat within a mating spline formed on the interior wall of boss 92. This arrangement permits attachment of the adaptor prior to mounting the overall unit. The splines enable selective but secure orientation of the unit. Adaptor 98 is sealed within boss 92 by a resilient washer 99.

Valve body assembly 70 includes a valve bore 104 which tapers so as to become more narrow in the region of ports 88 and 90 and in a direction toward input channel 16. Correspondingly tapered and seated within bore 104 is a valve stem 106. An O-ring 108 seated within a circumferential groove formed in a radial shoulder 110 on stem 106 serves to seal the valve stem within the outer and larger end of bore 104. A selecting knob 112 is mounted upon a necked-down outwardly-projecting shaft 114 which extends from valve stem 106, the knob being secured in place by means of a spring 116. Valve stem 106 is held longitudinally within bore 104 by means of an inwardly-projecting lug 117 formed in lower cover member 52.

Cut longitudinally into valve stem 106 is a recess 118. Recess 118, when aligned with port 90, permits fluid flow through inlet coupling 38 to pass into input channel 16, in progression outwardly from the inner end of stem 106. An inset 120 is cut laterally into stem 106 in a position at least generally opposite recess 118. Inset 120 is positioned in stem 106 so as to be in alignment between ports 88 and 90. Thus, when valve stem 106 is rotated to a position ninety degrees different from that shown in FIG. 4, fluid is permitted to flow from port 90 to port 88. To complete a seal between recess 118 and inset 120, a groove 122 is cut into stem 106 so as completely to surround inset 120, yet being exclusive of recess 118. A resilient O-ring 124 is then seated within groove 122. Therefore, O-ring 124 serves to block fluid flow to recess 118, while permitting fluid flow between ports 88 and 90 when inset 120 is aligned between the two ports.

It will be observed that the tapered wall of bore 104 must intersect the walls of ports 88 and 90. Such an intersection, without more, tends to leave a sharp edge positioned to damage O-ring 124. In the avoidance of such damage, the wall of bore 104 in the respective regions 138 and 140 immediately surrounding each of respective ports 88 and 90 is left untapered or aligned so as to be parallel with the longitudinal axis of valve stem 106. The tapered bore is thus blended into the untapered region by a radius or corner as indicated at 142 and 144, and the O-ring does not come into contact with the sharp area which exists at the junction between the port and the side wall of the bore.

Included within bore 104, and thus within input fluid channel 16, is a flow regulator 145. The regulator has a collar 151 with an internal opening 152 that accommodates water flow in what constitutes channel 16. A second part of regulator 145 is an orifice ring 146 that has circumferentially-spaced openings 147 defined by fluting that circumscribes a central cone 148. A resilient washer 149 has a central hole 150 and is sandwiched between collar 151 and ring 146.

In use, increased faucet pressure tends to depress washer 149 over cone 148 and toward openings 147 so as to deminish the flow of water through openings 147. For an incoming water pressure of between thirty and forty pounds per square inch, for example, this enables a regulation of flow rate to no more than about one and one-half gallons per minute. The flow rate becomes substantally constant at such a figure regardless of further increase in pressure supplied. One attribute of the inclusion of regulator 145 is the capability of setting a limit on the flow rate through cartridge 22. With any particular cartridge, adequate treatment will require that a limit be placed upon the maximum rate of flow. Regulator 145 serves as a means to that end.

Returning to the vicinity of the unit upon which cartridge 22 is mounted, valve body 70 includes a pair of upwardly projecting bosses 126 and 128. Upon the upper perimeter of each are a respective pair of rings 130 and 132 sonically welded in place and so shaped as to leave a circumferential external groove on each boss in which respective resilient O-rings 134 and 136 are situated.

Figure 13:
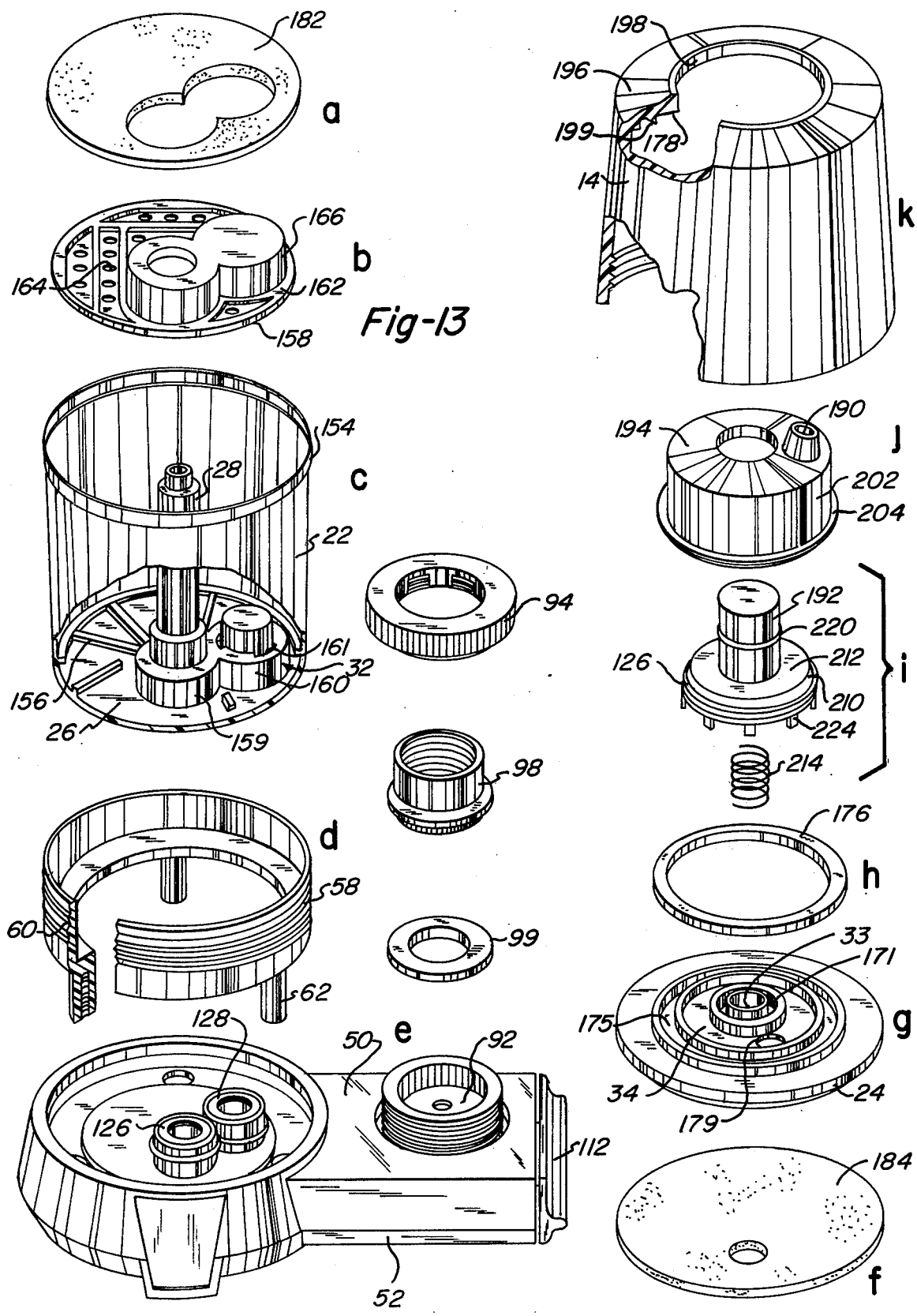
FIG. 13 is an exploded view, composed of subcomponent illustrations a-k, which depicts various details and indicates the nature of assembly of the overall device.

As previously indicated, cartridge 22 includes an inlet wall 26 and an outlet wall 24. A locating ring 154 protrudes outwardly at outlet wall 24, extending at least generally around the periphery of that outlet wall. Internal spacing ribs 156 (FIG. 13c for example) project inwardly from each end wall to hold the filter material in a spaced relationship in order to obtain a good flow profile. An apertured baffle plate 158 is spaced inwardly from inlet wall 26 and has a recess 166 to accommodate wells 159 and 160 (FIG. 13) that accept bosses 126 and 128. Baffle plate 158 and lateral openings 161 in well 160 permit the flow of water deflected by the baffle plate generally in the plane of inlet wall 26. That is, baffle plate 158 includes a plate 162 that has a plurality of apertures 164 and a recess 166 to accommodate wells 159 and 160 and, in turn, bosses 126 and 128. The combination insures that incoming water received through inlet 32 is uniformly distributed throughout the filter material. It will be observed that well 160 is in alignment with inlet opening 32 and that well 159 is at the lower end of conduit 28. These two wells 159 and 160 are so positioned as to be received upon respective O-rings 134 and 136. Cartridge 22 also includes locating rib 170, projecting outwardly from the inlet wall, which insures proper seating and alignment of the inlet and outlet openings.

Within outlet wall 24 is a recess 171 formed into its exterior surface so as to encircle the upper end of opening 33. A second recess 175 (FIG. 13g) is also formed into the exterior surface of outlet wall 24. A sealing element 176 is seated in recess 175. Facing element 176 is an undercut 178 in the bottom surface of the upper wall of cap 14. Further included in the exterior surface of outlet wall 24 is a third recess already defined as channel 34; it encircles recess 171 and is disposed between recesses 171 and 175, and conduit 28 terminates in an opening 179 in its bottom wall. The upper interior surface of cap 14 and an assembly yet to be described are formed as to permit water flowing upwardly through cartridge 22 to emerge from opening 33, pass over recess 171 and enter conduit 28. Inlet and outlet filters 182 and 184, preferably of felt, are sandwiched about the granulated filter material adjacent to each of the two end walls of cartridge 22.

Cartridge 22 is, as illustrated, that already fully disclosed in the cross-referenced applications. Accordingly, they are incorporated therein by reference. However, other cartridge structures are available for use in the apparatus herein under presentation. Of particular utility is the filter cartridge disclosed in application Ser. No. 814,485, filed July 11, 1977, and assigned to the same entity. That application, therefore, also is incorporated herein by reference.

As so far described in detail, the water filter apparatus is essentially the same as that described in aforesaid application Ser. No. 691,830. The embodiment of the present invention differs primarily in that it includes a spigot 190 located at the top of cap 14 for emitting water discharged from outlet opening 33. A control 192, in the form of a pushbutton, regulates the flow of water from outlet opening 33 through spigot 190. Spigot 190 projects upwardly from a central portion 194 of the top wall 196 of cap 14. Pushbutton 192 serves as an operator which also projects upwardly from that portion of top wall 196.

Defined in top wall 196, and centrally within undercut 178, is a mounting opening 198 in which, by means of fingers 199, is seated an assembly 200 that includes pushbutton 192 and spigot 190. As shown, spigot 190 and pushbutton 192 project above the remainder of top wall 196. Assembly 200, when seated within opening 198, forms a continuation of and closure for top wall 196. As specifically embodied, there are six of fingers 199 circumferentially spaced around undercut 178 and each shaped to seat assembly 200 with a snap fit.

Downwardly depending from the margin of central portion 194 is a skirt 202 from the lower end of which outwardly projects a lip 204. The downwardly facing horizontal surface defined by lip 204 and the bottom of the skirt 202 serves as a sealing face 206. Central portion 194 together with skirt 202 define a cavity 208 in which is defined a valve seat 210. Pushbutton 192 is integrally formed with a valve member 212 that cooperates with valve seat 210 and is urged by a compression spring 214 so as normally to close the passage of water into spigot 190. An O-ring 216, seated around the perimeter of member 212, assists in maintaining an adequate closure with valve seat 210. Pushbutton 192 is captivated within a downwardly-depending tube 218 formed in the center area of portion 194. An O-ring 220 is seated within a groove circumscribing pushbutton 192 so as sealingly to be received within tube 218. Spring 214 is received at its upper end within a well 222 located centrally within pushbutton 192. At its lower end, spring 214 is seated within recess 171 formed into the top wall of cartridge 22. A plurality of circumferentially-spaced feet 224, projecting downwardly from the periphery of valve member 212, are receivable in channel 34 formed in the top wall of cartridge 22.

In use, spring 214 causes valve member 212 to close against valve seat 210. This closing action is assisted by the pressure of water emerging from outlet opening 33 as urged against the bottom surface of valve member 212. It will be observed that the new combination includes outlet flowway 72 which is downwardly directed from base unit 36 so that the base unit, the cartridge 22 and cap 14 are arranged in a manner to permit discharge of water from flowway 72 selectively by operation of main valve 44. Thus, spigot 190 is so located as to divert water emerging from cartridge 22 and from an overall passageway which extends to flowway 72.

Spigot 190 may be selectively oriented in any rotational position relative to base unit 36. The user need only slightly loosen cap 14 in order to be able to rotate assembly 200 with respect to cap 14 and thus place spigot 190 at whatever comparative location is desired. Tightening cap 14 into place upon base unit 36 then serves to lock spigot 190 in a specific orientation as selected. When cap 14 is tightened into place, surface 206 abuts against sealing ring 176 so as to define the normal flow path from outlet opening 33 into conduit opening 179 and also to seal against the passage of water from opening 33 down around the sides of cartridge 22.

If desired, a tight seal could be included on the underside of assembly 200 so that, when pushbutton 192 is fully depressed, water could flow only from spigot 190 and none would continue to flow into conduit 28 and out flowway 72. However, that is not preferred or deemed to be necessary. Moreover, the diversion of water into conduit 28 in a controllable amount, as pushbutton 192 is depressed a selected extent, serves as a means for adjusting the height of the spout emitted from spigot 190.

Regulator 145 also serves to limit the maximum height of the spout emitted from spigot 190. As already mentioned, regulator 145 causes the flow rate into the filter cartridge to level out with increased incoming pressure. Another attribute of regulator 145 resides in its contribution to conservation of water. Absent the inclusion of the regulator, excessive incoming line pressure could result in an undesired waste of water. That attribute also leads to contemplation of the incorporation of regulator 145, as such, into other water control and distribution devices such as showerheads. In a showerhead, for example, regulator 145 would likewise be disposed in a main flow path and desirably could be constructed to effect a leveling of the flow rate to about two and one-half gallons per minute at between thirty and forty pounds per square inch of water pressure. A showerhead adaptation is the subject of co-pending application Ser. No. 913,284 filed June 7, 1978 and assigned to the same assignee as the present application.

One overall result is a device which permits the user to have selection as between (1) tap water used directly without filtering, (2) filtered water discharged downwardly as for collection in a drinking glass or other container or (3) filtered drinking water delivered upwardly as in a drinking fountain. It will be observed that the unit described and illustrated advantageously accepts and utilizes the very same filter cartridge also being utilized in the units described and claimed in the cross-referenced applications. Such adaptability leads to greater economy in the manufacture and sale of the cartridges. On the other hand, the approach of the present application enables modification of cap 14 and/or base 36 so as to permit use of differently designed filter cartridges whenever that might be desired. Similarly, other designs of filter assemblies may be modified so as to incorporate the herein structural principles that provide the feature of a drinking fountain.

The particular structural approach described herein is decidedly advantageous in that it permits a substantial minimization in the use of metallic parts. That, in turn, leads to economy of manufacture and long-time durability in the kind of usage envisioned.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

It is claimed:

1. Water filter apparatus comprising:
   a housing having a horizontally-disposed base unit;
   a coupling upstanding from one end portion of said base unit and attachable to a faucet for receiving a supply of water;
   an outlet downwardly directed from said base unit for discharging water received through said coupling;
   a valve disposed within said base unit for selectively permitting the flow of water through said coupling and in discharge from said outlet;
   an inverted cup-shaped cap removably secured to upstand from another portion of said base unit, said base unit including an input fluid channel leading from said valve to the chamber defined by said cap and said valve selectively permitting the flow of water through said coupling into said input fluid channel and thence into said chamber;
   a filter cartridge disposed within said cap and enclosing a filtration material, said cartridge having an inlet opening communicating water from said input channel to said material and an outlet opening disposed within said cap for communicating water from said material and out of said cartridge;
   a spigot located at the top of said cap for emitting water discharged from said outlet opening of said cartridge;
   a control for regulating the flow of water from said outlet opening of said cartridge through said spigot;
   means defining a second outlet downwardly directed from said base unit;
   and means defining an arrangement in which said base unit, said cartridge and said cap permit discharge of water from said second outlet selectively by operation of said valve.

2. Water filter apparatus as defined in claim 1 in which said spigot opens upwardly from a central portion of said top wall of said cap.

3. Water filter apparatus as defined in claim 1 in which said control includes an operator projecting upwardly from said top wall of said cap.

4. Water filter apparatus as defined in claim 1 in which said top wall of said cap includes means defining a mounting opening, in which an assembly is seated within said mounting opening, and in which said spigot and said control are disposed in said assembly.

5. Water filter apparatus as defined in claim 4 in which said assembly, including said spigot and said control, project above the remainder of said top wall.

6. Water filter apparatus as defined in claim 1 in which said spigot is located to divert water emerging from said filter cartridge from a passageway extending to said second outlet.

7. Water filter apparatus as defined in claim 6 in which said control is operable a selectable extent to divert said water emerging from said cartridge an adjustable amount into said spigot.

8. Water filter apparatus as defined in claim 1 which includes means for mounting said spigot to upwardly open from said top wall of said cap and permitting selective orientation of said spigot relative to said base unit.

9. Water filter apparatus as defined in claim 8 which includes means defining securement of said cap to said base unit that locks said spigot in a specific selected such orientation.

10. Water filter apparatus as defined in claim 1 in which said spigot is included in an assembly that cooperates with said cartridge in defining a flow path out of said cartridge.

11. Water filter apparatus as defined in claim 1 which further includes regulator means, disposed in said input fluid channel, for limiting the rate of water flow through said input fluid channel substantially to a predetermined maximum upon increase of incoming water pressure beyond a selected level.

12. Water filter apparatus comprising:
a housing having a horizontally-disposed base unit;
a coupling upstanding from one end portion of said base unit and attachable to a faucet for receiving a supply of water;
an outlet downwardly directed from said base unit for discharging water received through said coupling;
a valve disposed within said base unit for selectively permitting the flow of water through said coupling and in discharge from said outlet;
an inverted cup-shaped cap removably secured to upstand from another portion of said base unit, said base unit including an input fluid channel leading from said valve to the chamber defined by said cap and said valve selectively permitting the flow of water through said coupling into said input fluid channel and thence into said chamber;
a filter cartridge disposed within said cap and enclosing a filtration material, said cartridge having an inlet opening communicating water from said input channel to said material and an outlet opening disposed within said cap for communicating water from said material and out of said cartridge;
a spigot located at the top of said cap for emitting water discharged from said outlet opening of said cartridge;
a control for regulating the flow of water from said outlet opening of said cartridge through said spigot;
said top wall of said cap including means defining a mounting opening;
an assembly seated within said mounting opening; said spigot and said control being disposed in said assembly;
and means enabling a snap fit in the seating of said assembly within said mounting opening.

13. Water filter apparatus comprising:
a housing having a horizontally-disposed base unit;
a coupling upstanding from one end portion of said base unit and attachable to a faucet for receiving a supply of water;
an outlet downwardly directed from said base unit for discharging water received through said coupling;
a valve disposed within said base unit for selectively permitting the flow of water through said coupling and in discharge from said outlet;
an inverted cup-shaped cap removably secured to upstand from another portion of said base unit, said base unit including an input fluid channel leading from said valve to the chamber defined by said cap and said valve selectively permitting the flow of water through said coupling into said input fluid channel and thence into said chamber;
a filter cartridge disposed within said cap and enclosing a filtration material, said cartridge having an inlet opening communicating water from said input channel to said material and an outlet opening disposed within said cap for communicating water from said material and out of said cartridge;
a spigot located at the top of said cap for emitting water discharged from said outlet opening of said cartridge;
a control for regulating the flow of water from said outlet opening of said cartridge through said spigot;
and said top wall of said cap including a downwardly depending skirt which defines a cavity, means defining a valve seat formed on the inner wall of said cavity, and said control means including means defining a valve member resiliently urged against said valve seat as normally to close the passage of water into said spigot.

14. Water filter apparatus as defined in claim 13 which further includes a pushbutton projecting through said top wall of said cap and manually depressable to open said valve member from said valve seat.

15. Water filter apparatus as defined in claim 13 which includes a spring compressed between said valve member and said cartridge for biasing said valve member toward said valve seat.

16. Water filter apparatus comprising:
a housing having a horizontally-disposed base unit;
a coupling upstanding from one end portion of said base unit and attachable to a faucet for receiving a supply of water;
an outlet downwardly directed from said base unit for discharging water received through said coupling;
a valve disposed within said base unit for selectively permitting the flow of water through said coupling and in discharge from said outlet;
an inverted cup-shaped cap removably secured to upstand from another portion of said base unit, said base unit including an input fluid channel leading from said valve to the chamber defined by said cap and said valve selectively permitting the flow of water through said coupling into said input fluid channel and thence into said chamber;
a filter cartridge disposed within said cap and enclosing a filtration material, said cartridge having an inlet opening communicating water from said input channel to said material and an outlet opening disposed within said cap for communicating water from said material and out of said cartridge;

and regulator means, including a variable orifice assembly disposed in said input fluid channel and responsive to increasing input fluid pressure for automatically diminishing the flow of water through said input fluid channel, for limiting the rate of water flow through said input fluid channel substantially to a predetermined maximum upon increase of incoming water pressure beyond a selected level.

* * * * *